Dec. 16, 1952   J. D. CHANDLER   2,622,052
METHOD OF MAKING ORNAMENTED ARTICLES FROM SHEET
MATERIAL AND ARTICLES PRODUCED THEREBY
Filed Sept. 2, 1948   3 Sheets-Sheet 2
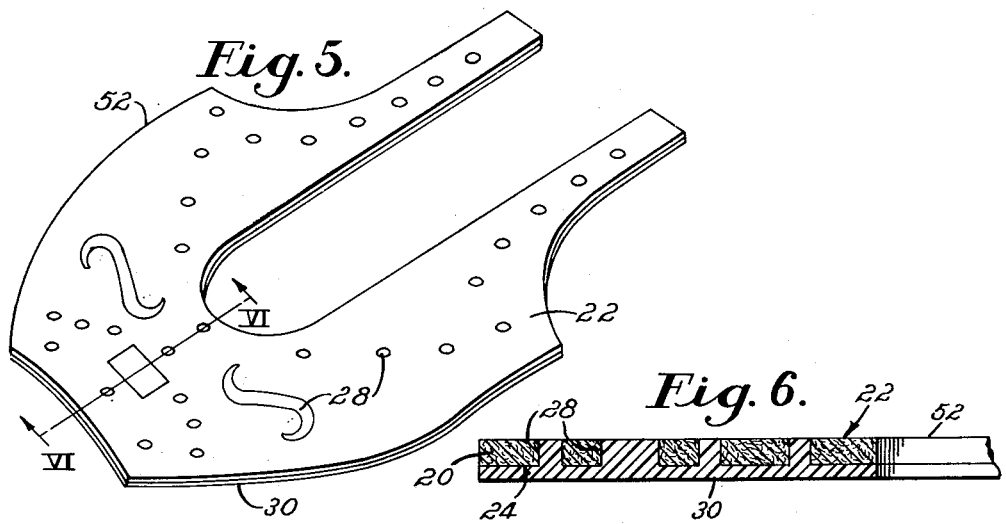
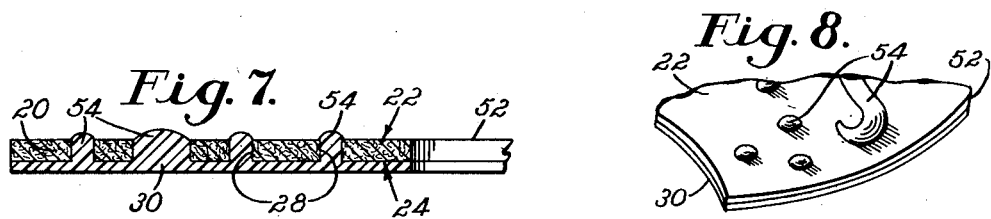
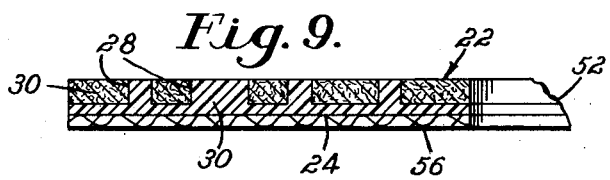
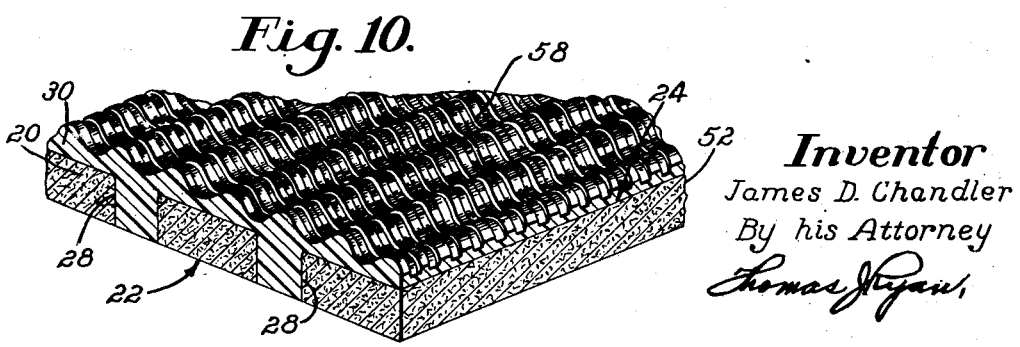
*Inventor*
James D. Chandler
By his Attorney
Thomas Bryan

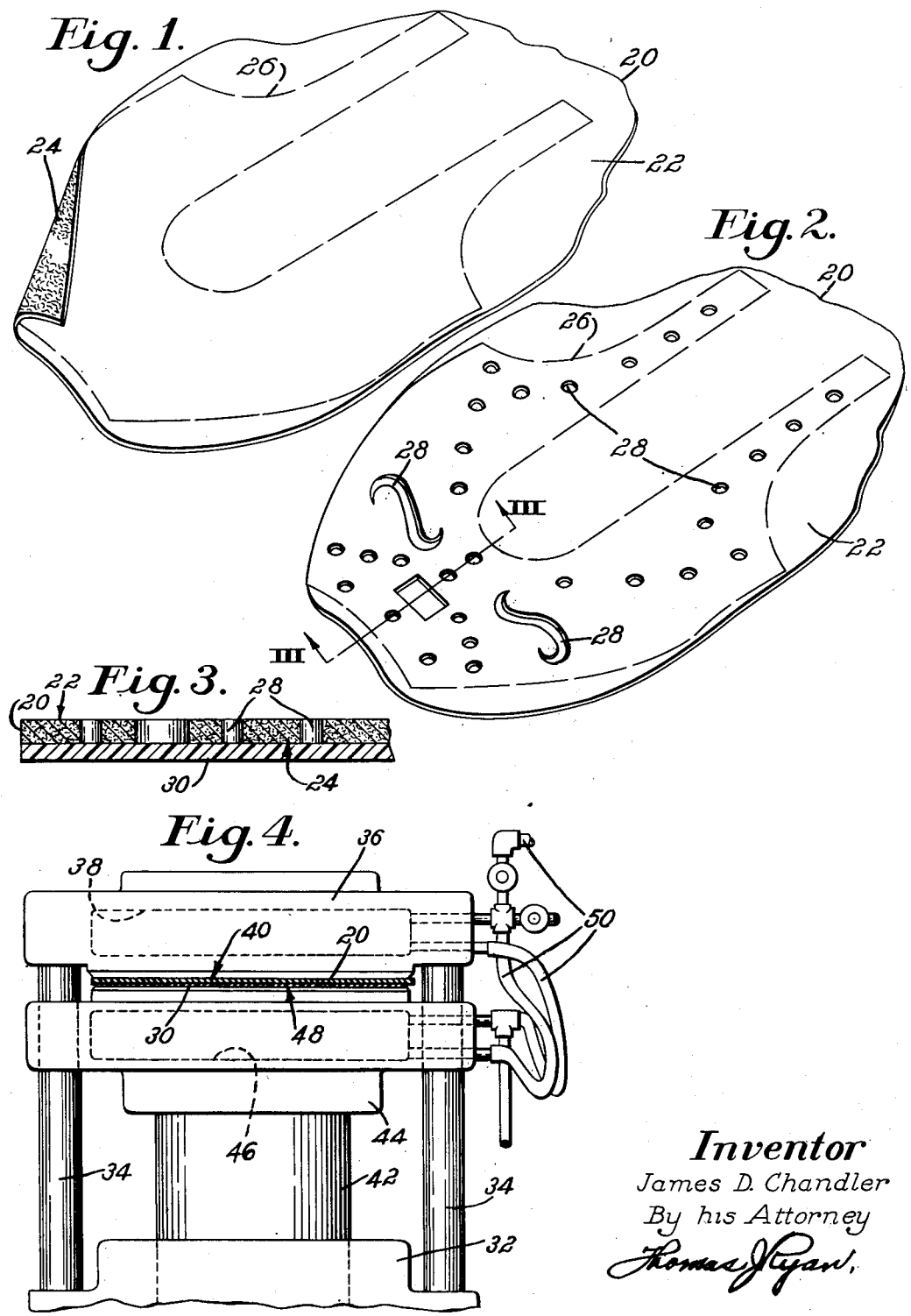

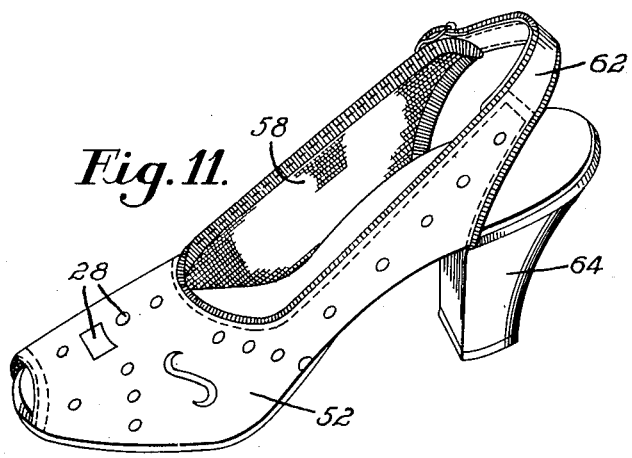
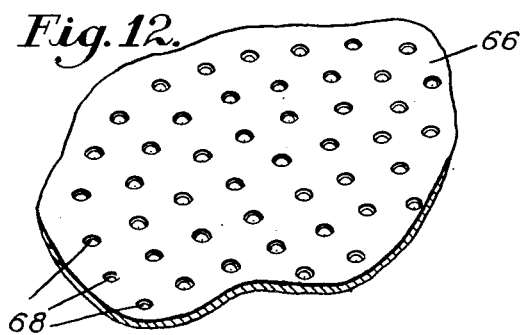
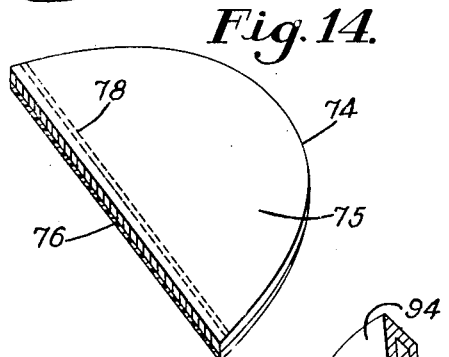
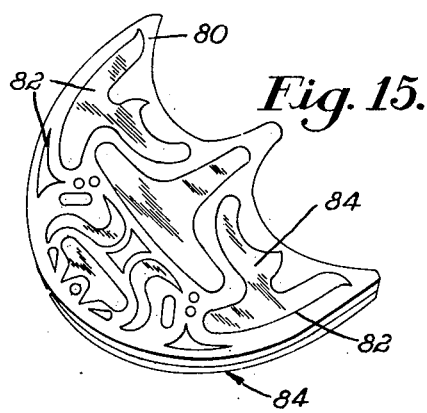
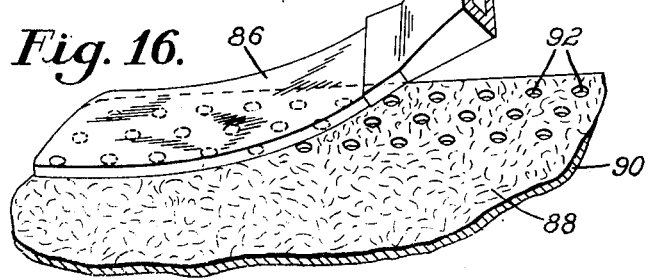
Inventor
James D. Chandler
By his Attorney
Thomas Ryan Patented Dec. 16, 1952

2,622,052

UNITED STATES PATENT OFFICE 2,622,052

METHOD OF MAKING ORNAMENTED ARTICLES FROM SHEET MATERIAL AND ARTICLES PRODUCED THEREBY

James D. Chandler, Swampscott, Mass., assignor to United Shoe Machinery Corporation, Flemington, N. J., a corporation of New Jersey Application September 2, 1948, Serial No. 47,462

6 Claims. (Cl. 154—106)

This invention relates to methods of ornamenting flexible sheet material, methods of making articles from such material and articles produced in the practice of such methods, the invention being illustrated herein by way of example with reference to shoe uppers.

In manufacturing many articles from flexible sheet material it is sometimes desirable to ornament the article to improve its appearance and thereby increase its value as an article of manufacture. Articles such as pocketbooks, cigarette cases, belts and shoe uppers are usually made from flexible sheet materials such as leather, fabric, plastic material and the like. In order to decorate these articles with ornamental designs, sheet materials such as those referred to have been ornamented in the past by staining, painting, embossing, burnishing or perforating usually in accordance with a predetermined pattern or design. When the sheet material has been ornamented by perforating, the holes or cutouts formed by the perforations have sometimes been covered by underlays of different materials secured to the inner surface of the sheet material. The perforations have also been filled in the past with inlays or inserts formed from a different material which contrasts in color or texture with the perforated material in order to accentuate the ornamental effect and also to restore the sheet material to its original unbroken or imperforate condition and thus produce an effect somewhat similar to damascening on metal such as iron or steel. These inlays or inserts have usually been cut to fit the perforations and have been secured therein in various ways, for example, by securing them by adhesive to a lining on the sheet material or by securing them by means of backing pieces or tabs provided on the inlays themselves, and adapted to be attached by cement or stitches to the sheet material adjacent to, or surrounding, the perforations.

It will be seen from the foregoing that methods of ornamenting sheet material practiced heretofore, particularly those involving perforations or cutouts in the material, were slow, expensive, difficult to carry out and not always productive of satisfactory results. They usually involved a great deal of work by one skilled in the art and did not always restore the perforated material to its original strength so that it was fit for use in making articles that required such strength, for example, belts or shoe uppers. Moreover, the inlays or inserts could not always be cut to fit the perforations properly and sometimes they were not secured therein in a manner that insured against their working loose or coming out of the perforations under constant tension or strain on the article during its use.

An important object of the present invention, therefore, is to provide an improved method of ornamenting sheet material by perforations or cutouts in a manner which is economical, fast and more efficient than methods used heretofore and which produces better results. Further objects of the invention are to provide an improved method of making ornamented articles from flexible sheet material, and to provide improved articles of manufacture in the practice of such method.

To the accomplishment of these objects and in accordance with one aspect of the invention, an improved method of ornamenting sheet material is provided which comprises providing a layer of flexible sheet material, perforating the sheet material by removing material therefrom to form holes or cutouts therein which extend completely through the material, and applying thermoplastic material to the perforated sheet material to cause the thermoplastic to fill the holes or perforations and thus render the sheet material imperforate or whole again while, at the same time, ornamenting the sheet material by said thermoplastic material. As herein illustrated, the perforations in the sheet material may be made in accordance with a uniform pattern or design throughout the entire area of the sheet material or they may, if desired, take the form of a predetermined or selected design.

The thermoplastic material is preferably applied to one surface only of the sheet material and it may be applied in the form of a calendered sheet or in an activated or softened condition. Moreover, it may be applied to the entire surface of the sheet material or to only the portion thereof adjacent to the perforations. When the thermoplastic material is applied in the form of a calendered sheet, it is placed upon one surface of the sheet material and the thermoplastic material is activated and softened by heat or other activating means, such as a solvent, and pressure is then applied to the superimposed layers to cause the thermoplastic material to flow into and fill the perforations. When applied in a softened or semi-liquid condition, the thermoplastic material will fill the perforations without the aid of heat or a solvent and, accordingly, it may be painted or extruded onto the sheet material.

In accordance with another of its aspects, the invention provides an improved method of making ornamented articles from sheet material which includes the steps of providing a flexible layer of sheet material, perforating the material in accordance with a predetermined pattern or design, applying thermoplastic material to one surface only of the sheet material to fill the perforations and coat said surface with thermoplastic material at least over the portion thereof adjacent to the perforations, and, after the thermoplastic material has hardened or set, cutting pieces from the sheet material suitable for producing the article. In accordance with the foregoing procedure, the shapes or outlines of the pieces to be cut from the sheet material are preferably indicated on the material before it is perforated and the designs formed by the perforations are located in predetermined positions with respect to the shapes or peripheries of the pieces which are to be cut from the sheet material to form the article.

In a more specific aspect, the invention contemplates the provision of an improved method of making ornamented articles such as shoe uppers from flexible sheet material, the sheet material comprising any of the materials commonly used for making uppers, such as leather, fabric, plastic material or the like. When leather is used, the thermoplastic material is applied to the flesh surface of the perforated leather sheet. The thermoplastic material may be colored to harmonize or contrast with the leather and thus accentuate the ornamental design on the completed upper. As stated above, the thermoplastic material fills the perforations or cutouts in the upper and thus restores it to its original imperforate condition while also ornamenting the upper, the thermoplastic material becoming permanently bonded to the leather or other material after the thermoplastic has set or returned to its original hardened condition. If it is desired to vary the ornamentation of the sheet material, the thermoplastic material may be caused to project somewhat beyond one surface of the sheet material to form protuberances on said surface, thereby causing the design to stand out plainly in relief on the sheet material and thus further ornamenting the upper or other article formed from the sheet material.

With the above and other objects and aspects in view, including the provision of improved articles of manufacture resulting from the practice of the present method, the invention will now be described in detail with reference to the accompanying drawings and will thereafter be pointed out in the claims.

In the drawings,

Fig. 1 is a perspective view of a layer of flexible sheet material, such as leather, with the outline of a shoe upper indicated in broken lines thereon, the grain surface of the leather facing upwardly;

Fig. 2 is a perspective view, similar to Fig. 1, showing the sheet material perforated to form holes therethrough, the perforations forming an ornamental design located in predetermined relation to the outline of the upper;

Fig. 3 is an enlarged sectional view through the perforated sheet material taken on the line III—III of Fig. 2 after thermoplastic material has been applied to the flesh surface of the leather;

Fig. 4 is a front elevation of a press adapted to apply heat and pressure to the superimposed materials of Fig. 3 to activate the thermoplastic material and force it into the perforations to fill said perforations and coat the flesh surface of the leather, at least over the portion thereof adjacent to the perforations;

Fig. 5 is a perspective view of the completed upper after it has been cut or died out of the perforated, thermoplastic-treated sheet material;

Fig. 6 is a sectional view on an enlarged scale through the upper taken on the line VI—VI of Fig. 5;

Fig. 7 is a sectional view similar to Fig. 6 showing the thermoplastic material bulging beyond the surface of the leather to form rounded protuberances thereon and thus create a different ornamental effect;

Fig. 8 is a fragmentary perspective view of a portion of the upper of Fig. 7 showing the ornamented surface thereof;

Fig. 9 is a sectional view similar to Fig. 6 but with a lining of fabric material covering the thermoplastic on the leather;

Fig. 10 is a greatly enlarged perspective view showing the thermoplastic material on the flesh surface of the upper after it has been embossed to simulate nonplastic material such as fabric;

Fig. 11 is a perspective view of the upper of Figs. 5 and 10 embodied in a shoe;

Fig. 12 is a perspective view of a sheet of flexible material perforated in a uniform pattern over its entire area;

Fig. 13 is a sectional view of the sheet material of Fig. 12 after thermoplastic material has been applied to one surface thereof and forced into the holes or perforations;

Fig. 14 is a perspective view of a shoe upper part, such as a toe piece or tip, provided with a double row of slits or perforations filled with thermoplastic material to produce the effect of stitches;

Fig. 15 is a perspective view of a tip in which the perforations or cutouts remove a substantial portion of the sheet material which is replaced by the thermoplastic material, thereby producing a different ornamental effect while also reinforcing the perforated material to retain its original strength; and Fig. 16 is a perspective view of a layer of sheet material perforated along one margin, the view illustrating the application of thermoplastic material to the perforated portion of the sheet material by extruding it from a nozzle.

In carrying out the method of the present invention, a layer of sheet material 20 suitable for making the desired article is provided, the sheet material illustrated in Fig. 1, by way of example, comprising a relatively thin layer of flexible leather appropriate for forming an upper for a shoe. The sheet material need not consist of leather, however, but may comprise fabric material such as canvas, faille, gabardine or similar fabrics, or it may, if desired, consist of other sheet materials such as artificial leather, plastic compositions or the like.

The leather layer 20 of Fig. 1 has a grain surface 22 and a flesh surface 24 which, in the completed article, form the outer and inner surfaces, respectively, of the finished article, this article in the present instance, as stated above, being a shoe upper. In cases where the layer of sheet material 20 is composed of a material other than leather, such as fabric, plastic material or the like, the upper and lower surfaces 22 and 24 of Fig. 1 will still constitute the outer and inner surfaces, respectively, of the completed article.

In accordance with one procedure illustrated herein, the layer of sheet material 20 may have the shape or periphery of the article to be produced marked in outline thereon, as indicated by the broken line 26 in Fig. 1, this procedure preferably being followed where a predetermined ornamental design is desired on the finished article. On the other hand, the article may, if desired, be first cut from the sheet material to substantially its finished shape, as illustrated in Fig. 5, before it is ornamented. In the latter instance, the article could be cut a little oversize if necessary to allow for trimming to final shape or size. In the case of shoe uppers, it is usually preferable to cut the upper first from the sheet material and then proceed with the rest of the method although either procedure could of course be utilized.

The layer of sheet material 20 of Fig. 1 is next perforated by removing material therefrom to form openings or holes 28 therein, the pattern of the perforations in the present instance forming a particular ornamental design which is located in a predetermined position relatively to the outline 26 of the article or part to be produced from the sheet material. As illustrated in Fig. 2, the perforations or cutouts 28 extend completely through the layer of sheet material 20 to form holes or openings therein. The design formed by the perforations in the present case is appropriate for producing the desired ornamental effect upon a shoe upper. The perforations may be formed by means of any usual type of perforating or clicking machine or they may, if desired, be produced by hand with the aid of punches, dies or other tools.

After the layer of sheet material 20 has been perforated as described, thermoplastic material is applied to the sheet material to fill the openings or holes 28 and render the sheet imperforate or whole again, the thermoplastic material becoming permanently united to the material of the sheet to form a solid or unbroken layer of material. In accordance with the procedure illustrated in Figs. 3 to 6, inclusive, thermoplastic material 30 is applied to one surface only of the sheet material, the surface to which it is applied preferably being the surface which is to form the inner side of the completed article or, in the present case, since the sheet material is composed of leather, the flesh surface 24 of the leather layer 20. As illustrated in Fig. 3, the thermoplastic material 30 may be applied to the flesh surface of the leather layer in the form of a calendered sheet of thermoplastic material in its normal hardened condition although, as hereinafter pointed out, the thermoplastic material may also be applied to the sheet material in a soft or semi-liquid condition. The calendered sheet of thermoplastic material 30 is placed against the flesh surface 24 of the leather layer 20 and the superimposed layers are then subjected to heat and pressure to activate and soften the thermoplastic material and cause it to flow into the perforations or cutouts 28 until it substantially fills said perforations and also coats the inner or flesh surface of the leather at least over those portions thereof adjacent to, or surrounding, the perforations 28. The thermoplastic material could, of course, be activated and softened by means other than heat if it happens also to be activatable by such other means, for example, a solvent, in which case the solvent would be applied directly to the thermoplastic material and the superimposed layers then subjected to pressure as described above.

The calendered sheet of thermoplastic material 30 may be sufficient in size to cover the entire flesh surface of the leather layer 20 although, in the interest of economy, it may be desirable to apply the thermoplastic sheet to those portions only of the sheet material where the perforations are located, thereby coating only that portion of the flesh surface of the leather adjacent to, or surrounding, the perforations.

The thermoplastic material utilized in practicing the present invention is preferably a vinyl resin composition which, as stated, may be applied to the sheet material either in the form of a uniform calendered sheet, as illustrated in Fig. 3, or in a semi-liquid or plastic condition. There are various vinyl resin compositions adapted for use in practicing the invention and any of these compositions may be utilized that are capable of being rendered soft and plastic by heat or a solvent and which, after the thermoplastic material has cooled or set, will adhere permanently to the material forming the flexible sheet to provide, in effect, an integral layer of sheet material. One example of a thermoplastic material adapted for use in carrying out the invention is a composition composed of 100 parts vinyl chloride-vinyl acetate copolymer, 25 to 75 parts of a suitable plasticizer, such as dioctyl phthalate, 5 parts titanium dioxide and such pigments and fillers as may be necessary to provide the required consistency to the composition and the desired color effect in the article to be produced. A disclosure of a thermoplastic composition such as that referred to used to coat an article such as a shoe upper to provide an integral plastic lining on the upper is contained in a copending application Serial No. 671,009, filed May 20, 1946, in the name of James B. Normington, now Patent No. 2,549,985, dated April 24, 1951.

As indicated above, the thermoplastic material may be applied to the flesh surface of the leather layer 20 in the form of a calendered sheet or in a soft or semi-liquid condition. When the thermoplastic material is applied to the sheet material in a calendered sheet after the sheet material has been perforated as described above, the calendered sheet 30 is placed upon the inner or flesh surface of the perforated layer 20, as shown in section in Fig. 3, and the superimposed layers are subjected to heat and pressure sufficient to activate and soften the thermoplastic material and simultaneously to press it into the perforations or openings 28 in the sheet material and thus cause the thermoplastic material to fill the perforations and also to coat the flesh surface 24 of the leather sheet adjacent to the perforations. While this operation may be performed in any usual or convenient manner, an apparatus particularly adapted for carrying it out is illustrated in Fig. 4, this apparatus being similar to that disclosed in the copending application above referred to. As illustrated in said application, the apparatus consists essentially of a relatively simple press 32 provided with a base which supports a pair of stationary vertical posts 34 having secured to their upper ends a casting 36 provided with a chamber 38 and a downwardly facing pressing surface 40. Mounted for vertical reciprocating movement between the posts 34 is a plunger 42 which may be operated hydraulically by any usual means (not shown) and which carries at its upper end a casting 44 provided with a chamber 46 and an upwardly facing pressing surface 48. The castings 36 and 44 are provided with openings to and from their chambers which are connected, by means of a plurality of flexible pipes or hose 50, to a steamer (not shown) whereby steam or hot air may be introduced into the chambers 38 and 46 to heat the castings 36, 44, including the pressing surfaces thereof, and thereby apply heat to the materials being operated upon. The arrangement is preferably such that both castings may be heated or, if desired, only one need be heated, depending upon the type of work operated upon. In the present case, for example, it may be preferable to heat only the casting 44 and the upwardly facing surface 48 upon which the thermoplastic material 30 rests. As explained in the copending application, the arrangement of the flexible connections 50 is such that, after steam has been forced into the chambers in the castings 36, 44, cold water may be introduced through the openings leading into the chambers to cool the castings quickly and thus cause the thermoplastic material 30 to harden or set more rapidly than it would normally set without the aid of such apparatus. The apparatus of Fig. 4 may be utilized, therefore, to apply heat and pressure simultaneously to the sheet of thermoplastic material 30 after it has been placed against the flesh surface of the leather layer 20 to activate the thermoplastic material and cause it to soften and flow into the perforations or holes 28 to fill these perforations and also to coat the inner or flesh surface of the leather sheet over its entire area, or, if desired, over only that portion thereof adjacent to, or surrounding, the perforations. The apparatus may then be caused, by the introduction of cold water into the chambers, to cool the thermoplastic material and thus cause it to harden or set quickly and become adhesively united or bonded to the sheet material 20 both on the flesh surface of the material and within the holes or perforations 28. If the thermoplastic material is activatable by a solvent as well as heat, the solvent may be applied to the thermoplastic material and the superimposed layers then placed in the press and subjected to pressure sufficient to cause the thermoplastic material to enter and fill the perforations 28.

It should be understood, of course, that any other convenient apparatus for applying pressure or heat and pressure to the calendered sheet of thermoplastic material and layer of sheet material may be used. The thermoplastic material could also be applied to the sheet material in a soft or semi-liquid condition by hand with the aid of a brush or, as will be hereinafter more fully explained, by extruding it from a nozzle or similar device.

After the thermoplastic material has been applied to the sheet material 20 and become firmly bonded thereto, as illustrated in Fig. 4, the piece which is to form the article to be manufactured from the sheet material is cut or died out of the leather sheet along the line 26, this article in the present instance, as indicated above, comprising a shoe upper 52 (Fig. 5) although, as stated, it might also comprise other articles of manufacture which can be made from flexible sheet material, such as handbags, belts, pocketbooks and the like. As already pointed out, the article may, if desired, be cut from the sheet material 20 before the material is perforated and the precut article then perforated with a design located in predetermined position relatively to the periphery of the article, the article being then coated with thermoplastic material to fill the perforations and cover one surface of the article. This procedure could be utilized, for example, to produce the upper shown in Fig. 5.

The upper illustrated in Fig. 5 is adapted for use in a low shoe or pump having an open toe and heel, the part 52 constituting the entire upper except for a connecting strap around the heel end of the shoe. The inner or flesh surface 24 of the upper is coated with thermoplastic material 30 which, in the present case, covers the entire inner surface of the upper and also fills the perforations or cutouts 28, the thermoplastic material in the perforations being substantially flush with the outer or grain surface 22 of the upper. Since the perforations 28 were formed in accordance with a selected ornamental design located in a predetermined position with respect to the outline or periphery of the upper, the plastic-filled cutouts or holes create an ornamental effect on the upper which has been attained heretofore only by the use of underlays or by inserting individual inlays or inserts of leather, Celluloid or similar materials, into perforations cut in sheet material and securing them separately therein. The thermoplastic material 30 is preferably of a different color or shade than the leather so that it will blend or contrast with the outer or grain surface thereof and thus accentuate the ornamental effect on the upper which, in some cases, may be extremely decorative so that it renders the upper much more attractive than a plain upper in the finished shoe without, however, lessening the capacity of the upper to withstand the stresses and strains to which it may be subjected during the manufacture of the shoe or during its wear. As illustrated on an enlarged scale in Fig. 6, the thermoplastic material 30 preferably fills the perforations or cutouts 28 flush with the outer or grain surface 22 of the leather and, consequently, does not form projections or raised places on this surface as are sometimes caused by the inserts or inlays above referred to. Moreover, since the thermoplastic material is adhesive when in a plastic condition, it becomes securely bonded to the material of the upper after the thermoplastic has set, not only on the inner or flesh surface of the leather but also on the walls of the perforations or cutouts 28, thereby insuring that the thermoplastic material will remain permanently in the perforations throughout the life of the shoe or other article formed from the sheet material, regardless of the strains put on such article.

It will be clear that, since the thermoplastic material 30 is caused to flow into the perforations under pressure by reason of the soft semi-liquid condition of the material itself when activated, perforations or cutouts of a relatively intricate pattern or design may be filled with thermoplastic material as easily and quickly as plain or simple perforations. Consequently, uppers or other articles composed of sheet material may be ornamented by the present method by perforations or cutouts of relatively intricate configuration which may readily be filled with thermoplastic material of a different color than the sheet material, for example, a contrasting or complemental color, to produce an ornamental effect which is more artistic than has ever been attained heretofore by methods which contemplate the filling of holes or perforations in sheet material with underlays or preformed inserts or inlays cut to fit the perforations.

If it should be desired to obtain a somewhat different ornamental effect on the upper or other article to be made from the sheet material 20, the thermoplastic material 30 may be applied to the sheet material in a manner that will cause it to project from the perforations 28 somewhat beyond the outer surface 22 of the sheet material, as illustrated in Fig. 7, to form protuberances or mounds 54 on the outer surface of the sheet material wherever the holes or perforations 28 are located and thus produce a different or more pronounced ornamental effect on the article and one which, in some cases, may be better suited for decorative purposes than the type shown in Fig. 6. The creation, for example, of a plurality of rounded protuberances 54 of plastic material in various contrasting or complemental shapes and colors on a single part or article of manufacture in accordance with a predetermined design produces an ornamental effect on completed articles such as uppers, belts, pocketbooks, handbags and so forth which renders them extremely attractive. Fig. 8 illustrates in perspective how a portion of the upper 52 will appear on its outer or grain surface when the thermoplastic material projects beyond the perforations 28 to form protuberances 54 on said grain surface.

In order to produce the projections or protuberances 54 on the outer surface of the sheet material, it is necessary merely to provide the pressing surface or plate 40 of the press 32, which engages the outer or grain surface of the sheet material 20 (Fig. 4), with depressions or indentations which correspond in size, shape and location with the perforations formed in the sheet material, these indentations in the pressing surface 40 being concave in shape to form the rounded protuberances on the sheet material or, if desired, having special designs such as flowers or other shapes formed therein to produce corresponding designs on the raised protuberances of thermoplastic material. Suitable means can be provided in such cases, such as gages, dowels or similar means, for positioning the superimposed layers 20 and 30 in the press 32 so that the perforations 28 in the sheet material 20 will be located in exact registration with the depressions in the pressing surface or plate 40.

While the inner surface or, in the case of leather, the flesh surface of the upper or other article may be coated over its entire area with thermoplastic material, as described above, it is also within the scope of the invention to coat only that portion of said flesh surface adjacent to, or surrounding, the perforations or cutouts. In this case, a band or strip of thermoplastic material in sheet form may be applied to the inner surface of the sheet material, the band being sufficient in size or width to cover only that portion of the sheet in which the perforations are located. Thus when the thermoplastic material has been caused to flow into and fill the perforations, it will coat only that portion of the inner surface of the article adjacent to or surrounding the perforations, thereby leaving the remaining portion of the layer of sheet material uncoated on its inner surface which, of course, substantially reduces the amount of thermoplastic material necessary for carrying out the method. In some cases, particularly when manufacturing shoe uppers from sheet material, the completed upper may, if desired, be covered on its inner or flesh side with a usual lining composed of conventional lining material, such as leather, faille, gabardine or similar materials, as illustrated in Fig. 9, the lining material 56 of that figure comprising fabric material which may be attached to the upper in any usual manner as, for example, by stitches or cement. Constructing an upper in this way not only economizes in the amount of thermoplastic material necessary for producing the desired ornamental effect, but also gives the upper the appearance of a conventional fabric lined upper on the inner side of the finished shoe.

Another variation in making uppers or similar articles from flexible sheet material, in accordance with the present invention, consists in applying thermoplastic material to the entire inner or flesh surface of the leather sheet, either in the form of a uniform calendered sheet or in a semi-liquid condition, as described above, to fill the perforations and cover the inner surface of the article throughout its entire area and, after the thermoplastic material has set, to emboss the thermoplastic material on said inner surface to cause it to simulate a conventional lining for an upper, such as leather, fabric or some other kind of nonplastic material. A method of embossing thermoplastic material on the flesh surface of a leather upper to cause it to simulate nonplastic lining material, such as faille or leather, is disclosed in the copending application above referred to. Fig. 10 of the present disclosure illustrates a thermoplastic lining on the flesh surface of the upper 52 after the thermoplastic material 30 has been embossed to simulate fabric, such as faille or gabardine. As disclosed in the application referred to, the leather upper has the thermoplastic material on its flesh surface embossed in any usual or convenient manner on the exposed surface only of the thermoplastic material to simulate a conventional nonplastic lining such as fabric. Fig. 10 illustrates the embossed thermoplastic lining on a greatly enlarged scale to show the character of the embossing and also the relative thicknesses of the leather forming the upper and the thermoplastic material forming the lining, the embossing being designated by the numeral 58. The embossing may be accomplished in any usual manner with the aid of rolls, platens, or the like or, if desired, it may be performed with the aid of an embossing apparatus of the type disclosed in the copending application. Moreover, the pressing surface or plate 48 of the press 32 could be utilized, if desired, to perform the embossing operation so that the embossing of the thermoplastic material 30 could be accomplished simultaneously with the activating and pressing of the thermoplastic material into the perforations or holes 28.

After the exposed surface of the thermoplastic material 30 on the upper has been embossed to simulate a conventional lining of fabric, leather or other nonplastic material, the upper 52 is in condition to be incorporated in a shoe, as illustrated in Fig. 11, the shoe of that figure having an open toe and heel with a strap 62 extending around its rear portion to complete the upper. It will be seen from Fig. 11 that the inner surface of the shoe, which is composed of the embossed thermoplastic material, presents the appearance of a conventional shoe having a usual fabric lining. It will also be noted that the ornamental effect produced by the perforations 28 filled with colored thermoplastic material substantially flush with the outer surface of the upper, greatly improves the appearance of the shoe while, at the same time, reinforces the upper to prevent it from being distorted or pulled out of shape during the pulling-over, lasting or other tension-exerting operations performed during its manufacture so that the completed shoe has the same symmetrical last-shaped contour or conformation as a shoe whose upper has not been perforated or cut away over a substantial portion of its area. It will be further observed that there are no projections or elevations present on the inner surface of the upper opposite the perforations, as would be the case if the perforations had been filled with preformed inlays or inserts secured in position by backing pieces or tabs engaging the inner surface of the upper or the lining and secured thereto for the purpose of holding the inserts permanently in the perforations.

As indicated above, the layer of sheet material from which the article is to be made need not be perforated, as illustrated in Fig. 2, in accordance with a particular design located in predetermined relation to the periphery or outline of the article. The layer of sheet material may, if desired, be perforated in accordance with a uniform pattern throughout its entire area, as illustrated in Fig. 12, the layer 66 of that figure being composed of leather, fabric, plastic or other flexible sheet material. As shown in Fig. 12, the perforations 68 comprise a plurality of circular openings or holes of relatively small diameter uniformly spaced throughout the entire area of the sheet material. In accordance with this variation of the invention, after the layer of sheet material 66 has been perforated all over by a uniform pattern of holes 68, a calendered sheet of thermoplastic material 70 (Fig. 13) is applied to one surface 71 of the sheet material, thereby determining the surface which will form the inner side of the completed article. The thermoplastic material 70 is treated by heat or a solvent, as described above, to cause it to soften and pressure is applied to the superimposed layers to force the thermoplastic material into the holes or perforations 68 to fill said perforations substantially flush with the opposite or outer surface of the sheet material, this latter surface being indicated in Fig. 13 by the reference numeral 72. After the thermoplastic material has set so that it is firmly bonded to the inner surface 71 of the layer 66 and also bonded to the walls of the holes or perforations 68, the part or parts which are to form the article are cut or died out of the layer of sheet material 66, after which the article may be manufactured or fabricated in accordance with the usual or preferred method of making such article. As stated above, the article could, if desired, be cut from the sheet material 66 before the material was perforated and the precut article then perforated and coated with thermoplastic material to fill the perforations as described above.

Although the invention is illustrated herein with reference to the manufacture of shoe uppers, it obviously is not limited to such articles of manufacture. The sheet material of Figs. 12 and 13, prepared as described, could, for example, be utilized to advantage in making many different types of articles in addition to shoe uppers. Since the thermoplastic material 70 may be of a different color or shade from that of the sheet material 66, the completed article could have an ornamental appearance which would render it extremely attractive for many different purposes. The ornamentation of the article by the present method, however, would not increase the cost of manufacturing the article any substantial amount. Moreover, since the perforations 68 are filled with thermoplastic material which is permanently bonded to the sheet material, the article will not be weakened by the perforations as it would be if the perforations, particularly large perforations, were not filled with material bonded to the sheet material. The thermoplastic material 70 on the inner surface of the layer 66 may, of course, be embossed as illustrated in Fig. 10, and the thermoplastic material in the holes or perforations 68 may, if desired, be caused to project beyond the perforations to form protuberances on the outer surface of the finished article in the manner indicated in Figs. 7 and 8. While the thermoplastic material is preferably applied to the sheet material 66 in the form of a hardened calendered sheet, it may, of course, be applied to the sheet material in a soft or semi-liquid condition, as explained above, with the aid of a brush or other implement if such procedure is more convenient.

Figs. 14 and 15 illustrate further variations of the invention which may be utilized, if desired, in making ornamented articles from flexible sheet material, Fig. 14 showing a toe piece or tip 74 for an upper, the tip being composed of leather or similar sheet material and provided across its rearward margin with a double row of small elongated perforations or holes which, when filled flush with the outer surface 75 of the sheet material with thermoplastic material 76 applied to the inner surface of the material in the manner described above, produces the effect of stitching 78 extending transversely of the tip across its rear or inner margin. The imitation stitching 78 is preferably of a color which contrasts with the material forming the tip and thus stands out clearly with respect to such material.

Fig. 15 illustrates a leather tip 80 for a man's shoe provided with a plurality of perforations or cutouts 82 which form a rather intricate design and which extend completely through the material over a major portion of the area of the tip, thereby removing the greater part of the sheet material forming the tip. The tip 80 of Fig. 15 would be substantially weakened by the large amount of material cut away by the cutouts or perforations 82 unless the latter were filled in the manner described herein by thermoplastic material 84 applied to the inner surface of the tip over its entire area so that the thermoplastic material fills the perforations until the thermoplastic is at least flush with the outer or grain surface of the tip, as shown in Fig. 15 or, if desired, until the thermoplastic material projects beyond the outer surface of the sheet material, in the manner illustrated in Figs. 7 and 8, to form protuberances on said outer surface. In this way the strength of the sheet material forming the tip 80 is not reduced by the perforations but is retained to a degree substantially equal to its strength before it was perforated and, in some cases, the sheet material may even be increased in strength owing to the fact that the thermoplastic material not only fills the perforations 82 but also covers and reinforces the inner surface of the sheet material.

As pointed out above, the thermoplastic material, in accordance with the present invention, may be applied to the sheet material either as a uniform calendered sheet or in a plastic or semi-liquid condition over the entire area of the sheet material or, if desired, over that portion only of the sheet material where the perforations are located. Fig. 16 illustrates the application of thermoplastic material 86 in a softened or semi-liquid condition to the flesh surface 88 of a layer of leather 90 along one margin thereof which has been perforated by a plurality of holes 92 located in uniformly spaced formation along such margin. The thermoplastic material is applied by extruding it from a nozzle 94 which may be connected by a hose or tube (not shown) to any usual source of supply such as a tank or reservoir, the thermoplastic material being extruded from the nozzle by pressure supplied by a pump or other suitable means. As illustrated in Fig. 16, the thermoplastic material may be applied to that portion only of the sheet material where the perforations are located, that is, along a predetermined width of its margin. Since the thermoplastic material is in a semi-liquid condition, it will readily flow into the perforations 92 as it is applied and fill the perforations at least to the level of the opposite or grain surface of the leather, the leather in such case preferably resting upon a flat work support or table. The thermoplastic material is extruded from the nozzle 94 in a relatively thin ribbon which is wide enough to cover that portion of the sheet material adjacent to, or surrounding, the perforations. When the thermoplastic material has set, it will be securely bonded to the sheet material, both in the holes and on the inner surface of the sheet material, as described above, whether the material be composed of leather, fabric, artificial leather, plastic or other sheet material. The thermoplastic material 86 will reinforce the margin of the sheet material so that this margin will not be weakened by reason of the perforations 92 therein regardless of the number or size of the perforations while, at the same time, the thermoplastic material will produce an ornamental effect along the outer surface of said margin which will enhance the appearance of the sheet material and increase its value for use in producing ornamented articles such as those referred to above. If it should be desired further to vary the ornamental effect produced in the sheet material 88, thermoplastic material of different colors may be extruded into the different perforations 92. In filling a plurality of holes or perforations with thermoplastic materials of different colors, a thermoplastic of one color may be applied to the portion of the sheet material containing selected holes and the thermoplastic material activated, pressed into such holes and allowed to set. A thermoplastic of another color may then be applied to the next series of perforations and this thermoplastic likewise activated, pressed into the holes and permitted to set. This same procedure may be repeated thereafter as long as there are any holes or perforations remaining to be filled with thermoplastic materials of other colors.

Having thus described my invention, what I claim as new and desire to secure by Letters Patent of the United States is:

1. That improvement in methods of ornamenting sheet material which comprises providing a flexible layer of leather, perforating said leather by removing material therefrom to form holes therein extending completely through the leather layer, said holes forming a predetermined ornamental design, and applying thermoplastic material to one side only of the perforated leather layer to fill said holes and thereby cause the thermoplastic material in said holes to show on the opposite side of said leather layer to ornament said layer.

2. That improvement in methods of decorating sheet material which comprises providing a layer of flexible leather of predetermined outline having a flesh surface and a grain surface, perforating said leather layer by removing material therefrom to form holes therein extending completely through the leather layer, said holes being located in accordance with an ornamental design located in predetermined relation to the outline of said layer, and applying an activated thermoplastic material to the flesh surface only of the leather layer to fill said holes flush with the grain surface of said leather layer and thereby return the leather layer to its original imperforate condition while decorating the said layer with an ornamental design on said grain surface, said thermoplastic material adhering to the leather in said holes and on said flesh surface and thereby also reinforcing the leather layer.

3. That improvement in methods of making ornamented shoe uppers which comprises providing a layer of leather material suitable for forming an upper, punching holes through said leather layer to remove material therefrom in accordance with a predetermined design, applying soft thermoplastic material to one side only of said layer to fill said holes substantially flush with the other side thereof, permitting the thermoplastic material to set to cause it to adhere to the leather material surrounding said holes, and cutting an upper from said layer with the plastic filled holes forming a decorative design relatively to the outline of said upper.

4. That improvement in methods of making ornamented shoe uppers which comprises providing a layer of leather having a grain surface and a flesh surface, marking the outline of a shoe upper on said grain surface, perforating said layer by removing material therefrom in accordance with an ornamental design located in a predetermined position with respect to said outline, placing thermoplastic material on the flesh surface of the perforated leather layer, heating said thermoplastic material to cause it to flow into and fill the perforations and also to coat the flesh surface of the leather adjacent to said perforations, permitting the thermoplastic material to cool and thus become bonded to the leather, and cutting the shoe upper from said layer on the outline marked thereon so that the ornamental design formed by the plastic filled perforations is located in predetermined relation to the outline of said upper.

5. That improvement in methods of making ornamented uppers for shoes which comprises providing a sheet of leather having a grain surface and a flesh surface, indicating on the grain surface the outline of a shoe upper, perforating said sheet to remove material therefrom and thus form holes therethrough in accordance with a selected design located in a predetermined position relatively to the outline of the upper indicated on said sheet, applying thermoplastic material to the flesh surface of the leather sheet, applying heat and pressure to said thermoplastic material with the aid of a plate to activate said material and cause it to flow into and fill said holes and also to coat the flesh surface of the leather sheet adjacent to the holes and become bonded thereto, embossing the exposed surface of the thermoplastic material which is on the flesh surface of the leather sheet with the aid of said plate simultaneously with the activation of said thermoplastic material to cause it to simulate fabric material, and cutting the upper from the leather sheet in accordance with the outline indicated thereon.

6. An article of manufacture comprising an ornamented shoe upper of leather having a grain surface and a flesh surface, perforations in said upper extending completely through the leather, said perforations forming an ornamental design on said upper located in predetermined relation to the periphery of the upper, and thermoplastic material filling said perforations substantially flush with the grain surface of the leather, said thermoplastic material extending beyond said flesh surface and coating at least the portions thereof adjacent to said perforations, said thermoplastic material being permanently bonded to the leather and contrasting in color with the upper and thereby accentuating the design formed thereon by said perforations.

JAMES D. CHANDLER.

REFERENCES CITED

The following references are of record in the file of this patent:

UNITED STATES PATENTS

| Number | Name | Date |
|---|---|---|
| 325,785 | Butterfield | Sept. 8, 1885 |
| 1,337,254 | Muench | Apr. 20, 1920 |
| 1,738,291 | Gatke | Dec. 3, 1929 |
| 1,831,058 | Cumfer | Nov. 10, 1931 |
| 2,003,494 | Reynolds | June 4, 1935 |
| 2,046,000 | Sart | June 30, 1936 |
| 2,071,921 | Dickson | Feb. 23, 1937 |
| 2,302,167 | Austin | Nov. 17, 1942 |
| 2,361,296 | Kennedy | Oct. 24, 1944 |
| 2,370,963 | Issaly | Mar. 6, 1945 |
| 2,413,500 | Hummel | Dec. 31, 1946 |
| 2,424,777 | Stuart | July 29, 1947 |

FOREIGN PATENTS

| Number | Country | Date |
|---|---|---|
| 979 | Great Britain | of 1888 |